United States Patent [19]

Bissinger et al.

[11] Patent Number: 5,078,932
[45] Date of Patent: Jan. 7, 1992

[54] METHOD AND APPARATUS FOR MAKING A DISPOSABLE CASTING PATTERN OF EXPANDED FOAMED BEADS

[75] Inventors: Fridolin Bissinger, Ludwigshafen; Erich Krzyzanowski, Frankenthal, both of Fed. Rep. of Germany

[73] Assignee: Grunzweig & Hartmann Und Glasfaser Ag, Ludwigshafen, Fed. Rep. of Germany

[21] Appl. No.: 542,793

[22] Filed: Jun. 21, 1990

Related U.S. Application Data

[63] Continuation of Ser. No. 687,139, Dec. 28, 1984, abandoned.

[30] Foreign Application Priority Data

Dec. 30, 1983 [DE] Fed. Rep. of Germany ....... 3347615

[51] Int. Cl.$^5$ .............................................. B29C 67/20
[52] U.S. Cl. .................................... 264/45.4; 264/51; 264/101
[58] Field of Search ................. 264/45.4, 51, 53, 101, 264/102, DIG. 5, DIG. 9, DIG. 15; 425/4 R, 812, 817 R

[56] References Cited

U.S. PATENT DOCUMENTS 3,853,972 12/1974 Berner ................................... 264/53
4,272,469 6/1981 Smith .................................... 264/53
4,482,306 11/1984 Hahn .................................... 425/4 R

*Primary Examiner*—Leo B. Tentoni
*Attorney, Agent, or Firm*—Cushman, Darby & Cushman

[57] ABSTRACT

In the production of thin-walled disposable casting patterns of expanded foamed plastic beads for the full mold casting method, difficulty is encountered in that the prefoamed preexpanded beads to be introduced into the pattern mold cavity with a bulk density of less than 20 g/l have a diameter of about 2 mm and consequently a reliable reproduceable complete filling of pattern mold cavities with a cross-section of less than 5 to 7 mm is not possible. It has been found that prefoamed and preexpanded beads nevertheless having adequate foaming agent content for the final foaming expansion in the pattern mold can be produced in that following prefoaming, evacuation of the steam-air atmosphere in the prefoamed chamber is effected and additional foaming agent is introduced. Due to the partial vacuum effected by the evacuation any condensate mist can be removed from the preexpanded beads without appreciable pressure drop in the interior of the beads and without a damaging cooling so that the foaming agent being supplied can diffuse very well into the fine beads having a large surface area. As a result, the entire foaming agent content of the beads can be used for the preexpansion so that a finer screen fraction of the beads can be used as starting product and smaller preexpanded beads are obtained. With these smaller beads smaller cross-sections of the pattern mold cavity can be properly filled and a smoother more regular surface can be obtained. To carry out the method it suffices to attach a vacuum line and a supply line for gaseous foaming agent to a conventional pressure prefoamer.

5 Claims, 1 Drawing Sheet

FINE BEADS CONTAINING FOAMING AGENT

PREFOAMED BY STEAM UNTIL ALL USEFUL FOAMING AGENT USED UP

BRIEF APPLICATION OF PARTIAL VACUUM TO REMOVE PREFOAMING ATMOSPHERE

SUPPLY ADDITIONAL FOAMING AGENT TO FORM A FOAMING AGENT ATMOSPHERE TO REPLACE THE EVACUATED PREFOAMING ATMOSPHERE AND TO DIFFUSE INTO THE PREFOAMED BEADS

FINE BEADS CONTAINING FOAMING AGENT
↓
PREFOAMED BY STEAM UNTIL ALL USEFUL FOAMING AGENT USED UP
↓
BRIEF APPLICATION OF PARTIAL VACUUM TO REMOVE PREFOAMING ATMOSPHERE
↓
SUPPLY ADDITIONAL FOAMING AGENT TO FORM A FOAMING AGENT ATMOSPHERE TO REPLACE THE EVACUATED PREFOAMING ATMOSPHERE AND TO DIFFUSE INTO THE PREFOAMED BEADS

METHOD AND APPARATUS FOR MAKING A DISPOSABLE CASTING PATTERN OF EXPANDED FOAMED BEADS

This is a continuation of application Ser. No. 06/687,139, filed Dec. 28, 1984, now abandoned.

Method of making disposable casting patterns consisting of expanded foamed material beads for the full mold casting method, preferably for manufacturing series produced castings, and apparatus for this purpose.

FIELD OF THE INVENTION

The invention relates to a method of making disposable casting models or patterns, consisting of expanded foamed plastic beads, for full mold casting, preferably for manufacturing series produced castings, as well as an apparatus particularly suitable for carrying out the method.

BACKGROUND OF THE INVENTION

Various methods are already known for making castings using patterns or models gasifiable at relatively high temperature. These methods are known under the term full mold casting and have the common feature that the pattern is "devoured" by the melt flowing in, the casting rate conveniently being so adjusted that cavities between the entering melt and the disappearing pattern are avoided as far as possible. The plastic for the lost pattern, usually polystyrene, usually has added thereto a radiation-absorbing dye to prevent gasification of the pattern before introduction of the melt. For exact castings it is generally necessary to carefully compact the molding sand or admix binders.

Although the full mold casting technique has meanwhile established a firm position in casting methods and is at present the most economical method in the production of large individual castings, it has not been able to completely establish itself in series and mass-produced casting. This was in particular because, for the reasons explained below, thin-walled castings could not be made or could not be made with the necessary dimensional accuracy of the wall thicknesses.

The readily gasifiable plastic for disposable patterns is provided in the form of small solid beads coated with a propellant or foaming agent. The introduction of the foaming agent is in the usual manner by the chemical industry. This preliminary product having a density of the order of magnitude of 600 kg/m$^3$ is then prefoamed under the action of heat to give a granulate consisting of expanded beads or grains and having a density of only 20 kg/m$^3$ or less. The granulate thus prefoamed is then introduced in likewise usual manner with carrier air into a foam mold until it fills the latter to a good degree of filling, whereafter subsequent foaming in the foam mold is effected usually by introducing steam, in which the individual expanded foamed plastic beads are pressed against each other and against the walls of the mold cavity by another although small volume increase to establish the necessary mutual connection and thus generate the foamed plastic body with the contour of the foam mold. In the foam mold either foam blocks can be produced, which in various working steps such as cutting and/or material-removing operations possibly with adhesion of the individual elements thus formed are processed to give the pattern, or alternatively in particular with relatively small castings the contour of the foam mold is adapted to the contour of the entire casting or a region thereof from the start so that in the foam mold a finished pattern or a finished pattern part is produced directly. For relatively small castings of complicated shape the latter procedure is of particular importance in economic production of a large number of disposable patterns of complicated shape for series production of castings.

The expanded beads of the prefoamed granulate introduced into the foam mold have with regard to the degree of prefoaming and the bead size of the preliminary product usually employed for the present purpose an average diameter of about 2 mm. With a wall thickness to be formed at the casting pattern and correspondingly a cavity in the foam mold having a width of for example 5 mm only two expanded beads can thus enter the narrow cross-section of the cavity without the expanded beads pressing each other against the wall of the mold. If a third bead drops into the gap between two such adjacent beads it tends to push the two outer beads apart and thus expands them against the wall of the foam mold. The friction between the expanded beads and the wall of the mold is relatively high so that such pressing of expanded beads against said wall can greatly obstruct or completely prevent movement of the beads. Thus, even when the filling operation is supported by carrier air, partial vacuum or the like, it is impossible to be sure that even the thin cross-section will be completely homogeneously filled with expanded beads. In particular under unfavourable conditions, for example when comparatively large expanded beads happen to meet, flaws can thus easily arise which are not filled up to the maximum density with expanded beads.

In particular with patterns with such thin walls in order to permit a troublefree and damage-free manipulation the pattern must be coated with a solidifying covering; such a coating of refractory, for example ceramic, material, frequently misleadingly referred to as blackwash, is also necessary when in the casting mold a forming material is used which is not adequately temperature-resistant with respect to the melt and consequently must be protected from direct contact therewith, for example quartz sand or steel granulate in the production of steel castings. When applied to the surface of the pattern the coating material penetrates into the cavities on the surface side and into outwardly open gussets between adjacent beads pressed against each other and consequently forms an irregular surface on the casting formed in the place of the foamed pattern. If there are additionally on the pattern surface flaws due to incomplete filling with expanded beads, the coating material can penetrate relatively far behind the theoretical surface line of the foamed plastic pattern. During casting the foamed material of the pattern gasifies whereas the corresponding contour of the coating material formed at the previous pattern surface remains. Thus, any penetration of the coating material into the surface of the foamed pattern remains behind as reduction in cross-section on the casting. In the region of a thin wall of the casting such a cross-section reduction in the foamed pattern can result in failure to obtain the necessary strength or other dimensional requirements and waste or, if the cross-sectional weakening is not recognized in good time, subsequent damage due to breakage. To recognize patterns not suitable for casting the pattern surface must be exactly investigated and this is not possible after application of the coating material because when this has been done only the outer surface of the coating material which does not come into contact with the melt is visible.

For this reason it is essential for surfaces of high quality and dimensional accuracy to be produced on the casting for the coating material for the foamed material pattern to be sure of finding a smooth surface of the foamed material as far as possible completely free of pores, let alone faults. Such smooth surfaces are of decisive importance particularly in the region of particularly small wall thicknesses to obtain in the casting the thin wall with homogeneous thickness and without weak points. However, precisely with small wall thicknesses beneath about 7 mm, macroscopic pores occur due to incomplete filling of the cross-section with expanded beads, as explained above, which lead to corresponding pores in the casting, whereas with smaller wall thicknesses still of only a few millimeters in spite of precautionary measures no practicable filling can be achieved at all so that series production is impossible even when the quality standards are low.

It has been known in the packing industry for example for a long time for the production of egg containers, cups, etc, to produce small wall thicknesses down to the order of magnitude of 1 mm. However, the production of particularly thin wall thicknesses is achieved simply by reducing the degree of the preliminary foaming or preexpanding. For a wall thickness of 2.5 mm expanded beads having a bulk density of about 50 g/l are used whilst for a wall thickness of 1.5 mm expanded beads having a bulk density of over 100 g/l are used, 90% of the beads then having a diameter of only between about 0.3 and 0.5 mm so that at least three beads can still be present adjacent each other to fill the wall cross-section without the beads jamming against the wall on introduction into the mold.

This method of simply reducing the preexpansion with small wall thickness of the pattern and thus producing correspondingly smaller expanded beads cannot be adopted for making disposable patterns for full mold casting. For an essential requirement of full mold casting is that the foamed material rapidly gasifies practically without residue when the melt enters and this requires a low density of the foamed material below 20 kg/m$^3$, or even better below 18 kg/m$^3$. This corresponds to a bulk density of the expanded beads of also about 15 to 20 k/l because for the present purposes the foam mold must be completely filled with expanded beads and the remaining expansion in the foam mold cannot lead to any further appreciable reduction of the density. Thus, it is not possible in the present field to employ a small degree of prefoaming to obtain expanded beads of small diameter.

This would leave the alternative of using a particularly fine-bead screen fraction of the preliminary product, prefoaming the latter with the desired high degree of preexpansion to obtain the low density, and using this product because for the same degree of prefoaming the expanded beads produced have of course a diameter which is the smaller the finer the beads of the preliminary product. However, unfortunately there are limits to this approach as well because for various reasons a maximum content of foaming agent of the order of magnitude of 6% by weight can be introduced into the preliminary product, propane and/or isopropane, butane or the like being using as foaming agent. However, part of the foaming agent escapes from the preliminary product due to aging, mechanical action and the like. Since however a particularly fine-bead screen fraction has a relatively greater surface area than a coarse fraction, it is precisely with such a fine-bead fraction that the mechanical action in the screening operation is greatest and the greatest surface area is available for the foaming agent to escape during storage so that as a rule fine-bead fractions retain less expandability than coarse-bead preliminary products. Since however on the other hand for the foaming operation and the subsequent final foaming in the mold a certain minimum foaming agent content is essential, this puts a limit on the fineness of the beads of the preliminary product which, since for the present purposes the finest possible beads are used in any case, does not make it possible to appreciably get below a bead size of the expanded material of about 2 mm. This in turn gives the minimum wall thickness of the casting mentioned at the beginning of about 5 to 7 mm if satisfactory filling is to be ensured in series production. When using still finer beads as preliminary product the proportion of foaming agent used for the preexpansion to the desired low density is so high that for the following final expansion in the mold the remaining foaming agent pressure is no longer adequate for agglomeration or "fusion" of the beads to form a good surface.

The problem underlying the invention is to provide a method of making disposable casting patterns consisting of expanded foamed material beads for full mold casting, preferably for the production of series castings, which permits a good filling even of small mold cross-sections of the foam mold in series casting and in the final foaming in the mold a good agglomeration of the expanded beads and formation of a good surface of the foamed plastic pattern.

SUMMARY OF THE INVENTION

This problem underlying the invention is solved by making an unfoamed fine-bead preliminary product containing a gaseous foaming agent. This product is prefoamed in a vessel, by heating with steam and subsequent drying, to such a degree that substantially the entire useful foaming agent in the product is used up. Immediately following such prefoaming, the atmosphere surrounding the prefoamed bead product is evaporated by a brief application of a partial vacuum to remove any condensate on the prefoamed beads and then additional foaming agent is supplied to the vessel for forming a foaming agent atmosphere to replace the evacuated atmosphere and which will diffuse into the prefoamed beads. The foaming agent in the preliminary product and later added after prefoaming may be a conventional gaseous agent, such as propane, and/or isopropane, butane or the like.

DETAILED DESCRIPTION OF THE INVENTION

Because the entire useful foaming agent of the preliminary product can be used for the prefoaming or preexpansion, a very fine-bead preliminary product can be chosen whose smaller expandability compared with a coarser bead preliminary product can be fully utilised for the preexpansion. During the preexpansion even with a very fine bead preliminary product the desired bulk density of the order of magnitude of 15 to 20 g/l is achieved, the expanded beads having however due to the fineness of the starting product a small diameter and thus being able to fill very well even small cross-sections of the foam mold.

However, the use of practically the entire useful foaming agent for the preexpansion leads to the expanded beads not having adequate expandability for the final foaming in the mold. This expandability for the final expansion is however obtained according to the invention in that immediately after the conclusion of the prefoaming the atmosphere surrounding the prefoamed material is evacuated and an additional foaming agent supplied to form a foaming agent atmosphere. It has been found that it is possible in this manner to introduce foaming agent again into the freshly expanded beads and thus obtain adequate expandability for the final foaming operation.

Preferably, the foaming agent is subjected to a slight excess pressure in the formation of the foaming agent atmosphere to promote the difusion into the expanded beads. For stabilization the expanded beads should reside in the foaming agent atmosphere thus produced for a period of a few minutes, in particular between 1 minute and 5 minutes, and in this period the slight excess pressure of the foaming agent atmosphere may be reduced to ambient pressure. The necessary residence time and any necessary slight excess pressure of the foaming agent atmosphere depend on the properties of the prelmminary product used and of the desired amount of foaming agent to be introduced.

As a rule the prefoaming is by introducing steam or vapor into the preexpansion chamber. For this purpose drying of the expanded beads is necessary which is usually brought about by subsequent air supply to the heated prefoamed material. However, condensate residues of the vapor remain on surfaces of the expanded beads. It has been found that the introduction of foaming agents in a foaming agent atmosphere into the expanded beads is unsuccessful if the surfaces of the expanded beads still have a condensate mist adherring thereto. Accordingly, where the prefoaming energy was introduced by steam means are provided for generation of a considerable partial vacuum between about 300 mbar and 800 mbar in the performing chamber to evacuate the steam-air atmosphere following the prefoaming, this partial vacuum being active only very briefly for between about 0.5 s and 2 s. By such a vacuum surge all the condensate at the surfaces of the expanded beads is converted to the gaseous phase and can escape so that an effective drying is obtained which leads to a practically complete removal of the condensate mist on the surface of the expanded beads. The magnitude of the partial vacuum and duration thereof must be chosen depending on the preliminary product used so that the partial vacuum does not lead to any damaging pressure drop inside the beads or a damaging cooling of the beads by heat transfer to the surrounding atmosphere at low pressure but nevertheless a complete as possible a removal of all condensate residues is obtained even in depressions of the microscopically rough surfaces of the beads. The partial pressure created briefly in this manner is then removed by additional supply of foaming agent and the foaming agent supplied can possibly be subjected to a slight excess pressure in the manner outlined above, and encounters in any case condensate-free surfaces of the expanded beads and can thus diffuse very well into said beads. Because the expanded beads are of particularly small size they have a relatively high specific surface area through which a comparatively large amount of foaming agent can penetrate.

Figures 1, 2:
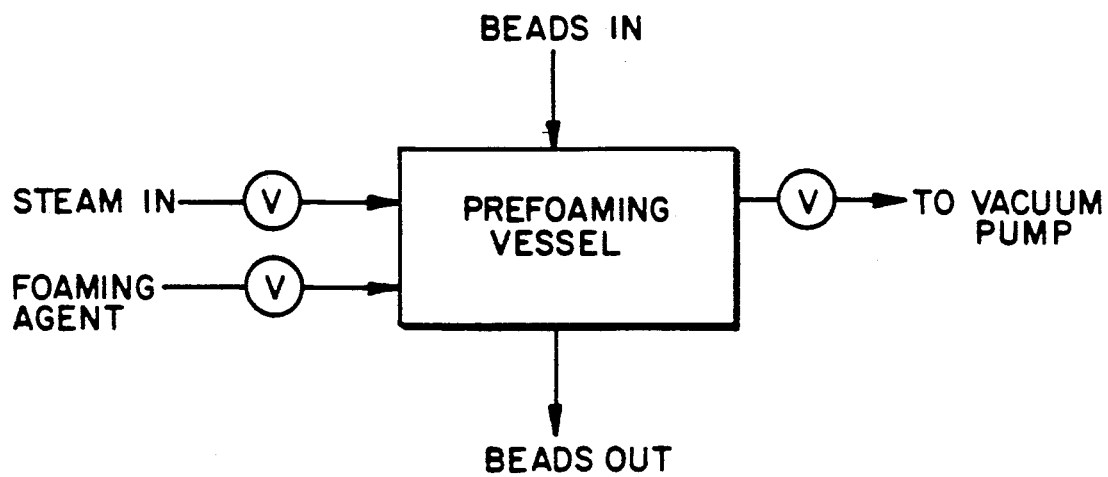
FIG. 1 is a flow diagram of the process of this invention.
FIG. 2 diagrammaticaly depicts simple apparatus for practicing the method of this invention wherein the prefoaming chamber or vessel has a connection for admitting a prefoaming heat carrying medium such as steam, a connection for drawing a partial vacuum in the vessel, and a connection for admitting a gaseous foaming agent.

The method according to the invention is particularly suitable for the production of disposable patterns or models or series castings and at the prefoaming chamber only one connection need be provided for extracting the steam-air atmosphere to generate a vacuum surge and one connection for a supply of gaseous foaming agent. The generation according to the invention of the final expandability of the beads already expanded preliminary to a higher degree only requires a period of a few minutes following the prefoaming, in which firstly the vacuum surge is generated and then the gaseous foaming agent supplied; after a short residence time the expanded beads are withdrawn into a preferably heated container and supplied to the foam molding machine. Should in a particular case intermediate storing become necessary it can be done without appreciable foaming agent loss in a foaming agent atmosphere, as is known per se.

In this manner according to the invention for the subsequent final foaming operation in the foam mold a preexpanded material of particularly fine bead quality is made available which nevertheless has adequate foaming agent content for the final foaming expansion. Thus, even thin cross-sections of the foam mold can be properly filled and the final foaming insures a smooth surface of the pattern and thus of the casting made with the disposable pattern. In a particularly advantageous manner the final expansion is carried out according to the method as disclosed in a co-pending U.S. patent application Ser. No. 687,032 of the same inventors filed simultaneously herewith and claiming the Convention priority of West German patent application P 33 47 616 of Dec. 30, 1983, the contents thereof being herein incorporated by reference. This method results in a further improvement of the surface quality.

We claim:

1. The method of making a vaporizable casting pattern consisting of expanded foamed material beads of very small diameter, the pattern to be introduced into a mold and then heated by the introduction of a heat carrier medium and finally foamed, the steps comprising:

making foamable fine beads of small diameter containing a useful content of a gaseous foaming agent;
prefoaming the beads by containing and heating the beads by directly contacting the beads with steam in a closed space to such a degree that the useful foaming agent content of the beads is substantially used up and a steam-air atmosphere is created in the space;
immediately following the prefoaming step subjecting the closed space containing the prefoamed beads to a partial vacuum to evacuate the atmosphere surrounding the beads in the closed space and substantially remove condensate which has formed on the beads as a result of the steam, the vacuum subjecting step being of such short duration that the prefoamed beads do not cool substantially; and immediately following the vacuum subjecting step forming a gaseous foaming agent atmosphere in the closed space containing the substantially condensate-free prefoamed beads to replace the evacuated atmosphere so that additional gaseous foaming agent will diffuse into the prefoamed beads and enable the beads to be further foamed after introduction into the mold.

2. The method defined in claim 1 wherein the gaseous foaming agent atmosphere is at a pressure slightly above atmospheric.

3. The method defined in claim 1 wherein the beads are surrounded by the gaseous foaming agent atmosphere for about 1 minute to about 5 minutes.

4. Method according to claim 1 wherein the partial vacuum formed in the evacuation is between about 300 mbar to 800 mbar below the atmospheric pressure.

5. Method according to claim 4, wherein the partial vacuum is maintained for a duration between 0.5 s to 2 s.

* * * * *